US009139680B2

(12) United States Patent
Horikawa et al.

(10) Patent No.: US 9,139,680 B2
(45) Date of Patent: Sep. 22, 2015

(54) COPOLYMER, RUBBER COMPOSITION, CROSSLINKED RUBBER COMPOSITION, AND TIRE

(75) Inventors: Yasuo Horikawa, Kodaira (JP); Shojiro Kaita, Oizumi-machi (JP); Olivier Tardif, Itabashi-ku (JP); Junko Matsushita, Tachikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 40 days.

(21) Appl. No.: 14/119,915

(22) PCT Filed: May 29, 2012

(86) PCT No.: PCT/JP2012/003507
§ 371 (c)(1),
(2), (4) Date: Nov. 25, 2013

(87) PCT Pub. No.: WO2012/164914
PCT Pub. Date: Dec. 6, 2012

(65) Prior Publication Data
US 2014/0179861 A1    Jun. 26, 2014

(30) Foreign Application Priority Data
Jun. 2, 2011    (JP) ................................. 2011-124637

(51) Int. Cl.
*C08F 297/08* (2006.01)
*C08L 53/00* (2006.01)
*C08F 297/00* (2006.01)
*C08K 3/00* (2006.01)
*B60C 1/00* (2006.01)

(52) U.S. Cl.
CPC ............... *C08F 297/086* (2013.01); *B60C 1/00* (2013.01); *C08F 297/00* (2013.01); *C08K 3/0033* (2013.01); *C08L 53/00* (2013.01)

(58) Field of Classification Search
CPC ............ B60C 1/00; C08L 53/00; C08K 3/00; C08F 293/00; C08F 293/05; C08F 297/06; C08F 297/08; C08F 297/083; C08F 297/086
See application file for complete search history.

(56) References Cited

U.S. PATENT DOCUMENTS

| 6,288,191 B1 | 9/2001 | Nishiyama et al. | |
| 2006/0142145 A1* | 6/2006 | Thiele | ............................ 502/103 |
| 2011/0136995 A1 | 6/2011 | Nakagawa et al. | |
| 2013/0197157 A1* | 8/2013 | Kaita et al. | ..................... 524/574 |
| 2013/0211032 A1* | 8/2013 | Kaita | ............................ 526/339 |

FOREIGN PATENT DOCUMENTS

| EP | 2599803 A1 | 6/2013 |
| EP | 2599808 A1 | 6/2013 |
| EP | 2671895 A1 | 12/2013 |
| JP | 11-228743 A | 8/1999 |
| JP | 11-315119 A | 11/1999 |
| JP | 2000-86857 A | 3/2000 |
| JP | 2000-154210 A | 6/2000 |
| JP | 2000-154221 A | 6/2000 |
| JP | 2004-277721 A | 10/2004 |
| JP | 2006-503141 A | 1/2006 |
| WO | 2009/148140 A1 | 12/2009 |
| WO | 2012/014420 A1 | 2/2012 |
| WO | 2012/014457 A1 | 2/2012 |
| WO | 2012/014459 A1 | 2/2012 |
| WO | WO-2012014455 A1 * | 2/2012 |

OTHER PUBLICATIONS

Machine translation of JP2000-086857 (Feb. 2015).*
International Search Report for PCT/JP2012/003507 dated Aug. 21, 2012.
Communication from Chinese Patent Office issued Oct. 23, 2014 in counterpart Chinese Patent Application No. 201280026894.0.
Research Development of the Copolymerization of Ethylene and Conjugated Diolefin, Song yuchun, Shanghai Chemical Industry/Oct. 2004, pp. 34-37.
Communication from the Russian Patent Office issued Nov. 19, 2014 in counterpart Russian Patent Application No. 1311832/81RU.
Communication from the Japanese Patent Office issued Oct. 21, 2014 in counterpart Japanese Patent Application No. 2013-517875.
Russian Office Action dated Jan. 20, 2015.
Supplementary European Search Report issued in EP Application No. 12793513.8, dated Feb. 25, 2015.

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

Provided is a block copolymer of a conjugated diene compound and a non-conjugated olefin, a rubber composition including the block copolymer, a crosslinked rubber obtained by crosslinking the rubber composition, and a tire using the rubber composition or the crosslinked rubber composition. The copolymer of the present invention is a block copolymer of a conjugated diene compound and a non-conjugated olefin, the copolymer having a peak area in a temperature range in a range of 70° C. to 110° C. that accounts for at least 60% of a peak area in a range of 40° C. to 140° C. and a peak area in a range of 110° C. to 140° C. that accounts for 20% or less of a peak area in a range of 40° C. to 140° C., the peak areas being measured by the differential scanning calorimetry (DSC) according to JIS K 7121-1987.

15 Claims, 4 Drawing Sheets

COPOLYMER, RUBBER COMPOSITION, CROSSLINKED RUBBER COMPOSITION, AND TIRE

CROSS REFERENCE TO RELATED APPLICATIONS

This application is a National Stage of International Application No. PCT/JP2012/003507 filed May 29, 2012, claiming priority based on Japanese Patent Application No. 2011-124637 filed Jun. 2, 2011, the contents of all of which are incorporated herein by reference in their entirety.

TECHNICAL FIELD

The present invention relates to a copolymer of a conjugated diene compound and a non-conjugated olefin, a rubber composition, a crosslinked rubber composition, and a tire, and more particularly to a block copolymer of a conjugated diene compound and a non-conjugated olefin, the copolymer being used for manufacturing a rubber excellent in fatigue resistance, low-heat generation, and elongation at break, a rubber composition including the block copolymer, a crosslinked rubber composition obtained by crosslinking the rubber composition, and a tire manufactured by using the rubber composition or the crosslinked rubber composition.

BACKGROUND ART

At least two different monomers can be polymerized in the same polymerization system so as to generate a copolymer having those different monomer units arranged as repeating units in one polymer chain, and the copolymer thus obtained can be classified into a random copolymer, an alternating copolymer, a block copolymer, or a graft copolymer, depending on the arrangement of the monomer units. However, no report has been made on the arrangement of monomer units in polymerization reaction of a conjugated diene compound and a non-conjugated olefin.

For example, JP 2000-154210 A (PTL 1) discloses a catalyst for polymerization of a conjugated diene, the catalyst including a group IV transition metal compound which has a cyclopentadiene ring structure, in which an α-olefin such as ethylene is exemplified as a monomer copolymerizable with the conjugated diene. However, no reference is made on the arrangement of monomer units in the copolymer. Further, JP 2006-249442 A (PTL 2) discloses a copolymer of an α-olefin and a conjugated diene compound, but no reference is made on the arrangement of monomer units in the copolymer. Further, JP 2006-503141 A (PTL 3) discloses an ethylene-butadiene copolymer synthesized by using a catalytic system consisting of a specific organometallic complex, but merely describes that the butadiene as a monomer is inserted in the form of trans-1,2-cyclohexane into the copolymer, without making any reference to the arrangement of monomer units in the copolymer, and no reference is made to defining the length (molecular weight) of a unit derived from a non-conjugated olefin in the block copolymer of a conjugated diene compound and a non-conjugated olefin so as to manufacture a rubber that is excellent in fatigue resistance, low-heat generation, and elongation at break.

In addition, JP 11-228743 A (PTL 4) discloses an unsaturated elastomer composition composed of an unsaturated olefin-based copolymer as a random copolymer and a rubber. However, it is merely described that monomer units in the copolymer are randomly arranged, and no reference is made to defining the length (molecular weight) of a unit derived from a non-conjugated olefin in the block copolymer of a conjugated diene compound and a non-conjugated olefin so as to manufacture a rubber that is excellent in fatigue resistance, low-heat generation, and elongation at break.

Further, JP 2000-86857 A (PTL 5) discloses a butadiene copolymer in which: a vinyl bond content (vinyl bond content, the content of 1,2 adducts (including 3,4 adducts)) is 6%; a cis content is 92%; and an ethylene content is 3% or 9%. However, the length (molecular weight) of a unit derived from ethylene in the copolymer is large, and thus, due to the crystallinity of ethylene, the physical property of the copolymer becomes similar to plastics in terms of physical property, leading a problem that fatigue resistance (bending and elongation test resistance) and elongation at break are impaired.

In addition, JP 2000-86857 A gives no reference or suggestion to defining the length (molecular weight) of a unit derived from a non-conjugated olefin in the block copolymer of a conjugated diene compound and a non-conjugated olefin so as to manufacture a rubber that is excellent in fatigue resistance, low-heat generation, and elongation at break.

CITATION LIST

Patent Literature

PTL 1: JP 2000-154210 A
PTL 2: JP 2006-249442 A
PTL 3: JP 2006-503141 A
PTL 4: JP 11-228743 A
PTL 5: JP 2000-86857 A

SUMMARY OF INVENTION

Technical Problem

In view of the above, an object of the present invention is to provide: a block copolymer of a conjugated diene compound and a non-conjugated olefin, which is used for manufacturing a rubber excellent in fatigue resistance, low-heat generation property, and elongation at break; a rubber composition including the block copolymer; a crosslinked rubber composition obtained by crosslinking the rubber composition; and a tire manufactured by using the rubber composition or the crosslinked rubber composition.

Solution to Problem

The inventors of the present invention have achieved the present invention based on the following findings. That is, a block copolymer of a conjugated diene compound and a non-compound olefin in which the length (molecular weight) of a block sequence including monomer units of a non-conjugated olefin is defined may be used to manufacture a rubber that is excellent in fatigue resistance, low-heat generation property, and elongation at break.

That is, the copolymer according to the present invention is a copolymer of a conjugated diene compound and a non-conjugated olefin, the copolymer being a block copolymer having a feature in that a peak area in a temperature range of 70° C. to 110° C. accounts for at least 60% of a peak area measured in a temperature range of 40° C. to 140° C., and a peak area measured in a temperature range of 110° C. to 140° C. accounts for 20% or less of a peak area measured in a temperature range of 40° C. to 140° C., the peak areas being measured by the differential scanning calorimetry (DSC) according to JIS K 7121-1987.

Here, according to the present invention, the block copolymer refers to a copolymer including a block sequence including monomer units of a conjugated diene compound and a block sequence including monomer units of a non-conjugated olefin.

In another preferred example of the copolymer of the present invention, a cis-1,4 bond content in a unit derived from the conjugated diene compound is at least 80%.

In another preferred example of the copolymer of the present invention, the non-conjugated olefin (unit derived from the non-conjugated olefin) is contained over 0 mol % to 40 mol % or less.

In another preferred example of the copolymer of the present invention, the block copolymer has one of the structures including $(A-B)_x$, $A-(B-A)_x$, and $B-(A-B)_x$ (here, A represents a block sequence including monomer units of a non-conjugated olefin; B represents a block sequence including monomer units of a conjugated diene compound; and x represents an integer of at least 1). Here, a block copolymer including a plurality of structures of (A-B) or of (B-A) is referred to as multiblock copolymer.

The copolymer of the present invention preferably has a polystyrene-equivalent average-weight molecular weight of 10,000 to 10,000,000.

The copolymer of the present invention preferably has a molecular weight distribution (Mw/Mn) of 10 or less.

In a preferred example of the copolymer of the present invention, the non-conjugated olefin is an acyclic olefin.

In another preferred example of the copolymer of the present invention, the non-conjugated olefin has 2 to 10 carbon atoms.

In the copolymer of the present invention, the non-conjugated olefin is preferably at least one selected from a group consisting of ethylene, propylene, and 1-butene, and the non-conjugated olefin is more preferably ethylene.

In another preferred example of the copolymer of the present invention, the conjugated diene compound is at least one selected from a group consisting of 1,3-butadiene and isoprene.

A rubber composition of the present invention includes the copolymer of the present invention.

The rubber composition of the present invention preferably includes, with respect to 100 parts by mass of the rubber component, a reinforcing filler by 5 parts by mass to 200 parts by mass, and a crosslinking agent by 0.1 parts by mass to 20 parts by mass.

A crosslinked rubber composition of the present invention is obtained by crosslinking the rubber composition of the present invention.

A tire according to the present invention is manufactured by using the rubber composition of the present invention or the crosslinked rubber composition of the present invention.

Advantageous Effect of Invention

The present invention is capable of providing: a block copolymer of a conjugated diene compound and a non-conjugated olefin, which is used for manufacturing a rubber excellent in fatigue resistance, low-heat generation property, and elongation at break; a rubber composition including the block copolymer; a crosslinked rubber composition obtained by crosslinking the rubber composition; and a tire manufactured by using the rubber composition or the crosslinked rubber composition.

BRIEF DESCRIPTION OF DRAWINGS

The present invention will be further described below with reference to the accompanying drawings, wherein.

DESCRIPTION OF EMBODIMENTS (Copolymer)

Figure 1:
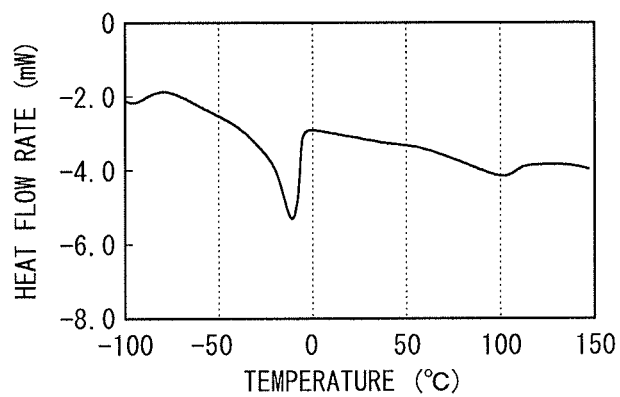
FIG. 1 shows a DSC curve of a block copolymer A.

The present invention will be described in detail hereinafter. The present invention provides a copolymer of a conjugated diene compound and a non-conjugated olefin copolymer, the copolymer being a block copolymer having a feature in that a peak area measured in a temperature range of 70° C. to 110° C. accounts for at least 60% of a peak area measured in a temperature range of 40° C. to 140° C., and a peak area measured in a temperature range of 110° C. to 140° C. accounts for 20% or less of a peak area measured in a temperature range of 40° C. to 140° C., the peak areas being measured by the differential scanning calorimetry (DSC) according to JIS K 7121-1987.

The copolymer of the present invention includes a block sequence including monomer units of the non-conjugated olefin to show static crystallinity, and thus is excellent in mechanical properties such as fracture strength. Further, the copolymer of the present invention includes a block sequence including monomer units of the conjugated diene compound, and thus is allowed to behave as an elastomer.

According to the copolymer of the present invention, the block copolymer to be formed is identified mainly by means of differential scanning calorimetry (DSC) and nuclear magnetic resonance (NMR). Here, the differential scanning calorimetry (DSC) is a measuring method according to JIS K 7121-1987. Specifically, when the DSC observes a glass transition temperature derived from a block sequence including monomer units of a conjugated diene compound, a crystallization temperature derived from the block sequence, and a crystallization temperature derived from a block sequence including monomer units of a non-conjugated olefin, it means that the copolymer has a block sequence including monomer units of a conjugated diene compound and a block sequence including monomer units of a non-conjugated olefin formed therein.

The use of a block copolymer having a peak area in a temperature range of 70° C. to 110° C. that accounts for at least 60% of a peak area in a temperature range of 40° C. to 140° C., and a peak area in a temperature range of 110° C. to 140° C. that accounts for 20% or less of a peak area measured in a temperature range of 40° C. to 140° C., the peak areas being measured by the differential scanning calorimetry (DSC) according to JIS K 7121-1987, allows for obtaining a rubber that is highly excellent in both of fatigue resistance and low-heat generation.

The peak in the range of 70° C. to 110° C. indicates formation of a block sequence including monomer units of a non-conjugated olefin (for example, ethylene) of relatively small weight-average molecular weight (about 1000 to about 30000), while the peak in the range of 110° C. to 140° C. indicates formation of a block sequence including monomer units of a non-conjugated olefin (for example, ethylene) of relatively large weight-average molecular weight (about 30000 or more). The peak in the range of 40° C. to 140° C. is based on a unit derived from a non-conjugated olefin (for example, ethylene).

Accordingly, when a peak area in a range of 70° C. to 110° C. accounts for at least 60% of a peak area in a range of 40° C.

to 140° C. and a peak area in a range of 110° C. to 140° C. accounts for 20% or less of a peak area in a range of 40° C. to 140° C., it means that the block sequence including monomer units of a non-conjugated olefin has a larger ratio of units having smaller molecular weight (short block unit in which the degree of polymerization of a non-conjugated olefin is about 40 to 1000).

In the copolymer of the present invention, the cis-1,4 bond content in the conjugated diene compound unit (unit derived from a conjugated diene compound) is preferably at least 80%, more preferably over 92%, particularly preferably at least 95%, and most preferably at least 97%. When the conjugated diene compound unit (unit derived from a conjugated diene compound) has a cis-1,4 bond content of at least 80%, a block sequence including monomer units of a conjugated diene compound exhibits elongation crystallinity, which leads to a further improvement in mechanical properties such as fracture strength and fatigue resistance.

The cis-1,4 bond content described above refers to a content in a unit derived from the conjugated diene compound, and does not refer to a content ratio with respect to the entire copolymer.

In the copolymer of the present invention, the content of 1,2 adducts (including 3,4 adducts) in the conjugated diene compound (the content of 1,2 adduct unit (including 3,4 adduct unit) in a unit derived from a conjugated diene compound) is preferably 5% or less. When the content of 1,2 adducts (including 3,4 adducts) in the conjugated diene compound unit is 5% or less, the copolymer of the present invention can further be improved in ozone resistance and fatigue resistance. Further, when the content of 1,2 adducts (including 3,4 adducts) in the conjugated diene compound unit is 2.5% or less, the copolymer of the present invention can furthermore be improved in ozone resistance and fatigue resistance. The content of 1,2 adducts (including 3,4 adducts) in the conjugated diene compound unit is further preferably 2.0% or less.

The content of 1,2 adduct unit (including 3,4 adduct unit) described above refers to a content in a unit derived from the conjugated diene compound, and does not refer to a content ratio with respect to the entire copolymer.

Here, when the conjugated diene compound is butadiene, the content of 1,2 adduct unit (including 3,4 adduct unit) in the conjugated diene compound unit (content of 1,2 adduct unit (including 3,4 adduct unit) of a conjugated diene compound in a unit derived from a conjugated diene compound) can be considered synonymous with the 1,2-vinyl bond content.

The copolymer of the present invention is free of a problem of molecular weight reduction, and the weight-average molecular weight (Mw) thereof is not specifically limited. However, in view of the application to polymer materials, a polystyrene-equivalent weight-average molecular weight (Mw) of the copolymer is preferably 10,000 to 10,000,000, more preferably 10,000 to 1,000,000, and furthermore preferably 50,000 to 600,000. Further, the molecular weight distribution (Mw/Mn) obtained as a ratio of the weight-average molecular weight (Mw) to the number average molecular weight (Mn) is preferably 10 or less, and more preferably 5 or less, because the molecular weight distribution exceeding 10 results in nonuniform physical property. Here, the average molecular weight and the molecular weight distribution can be determined by gel permeation chromatography (GPC) using polystyrene as a standard reference material.

According to the copolymer of the present invention, the content of the non-conjugated olefin (unit derived from the non-conjugated olefin) is preferably over 0 mol % to 40 mol % or less. The content of the non-conjugated olefin (unit derived from the non-conjugated olefin) falling within the ranges specified above is capable of more reliably improving mechanical properties such as fracture strength. Further, in view of improving mechanical properties such as fracture strength without causing macrophase separation of the copolymer, the content of the aforementioned non-conjugated olefin (unit derived from the non-conjugated olefin) is more preferably over 0 mol % to 30 mol % or less.

On the other hand, according to the copolymer of the present invention, the content of the conjugated diene compound (unit derived from the conjugated diene compound) is preferably 60 mol % or more to less than 100 mol %, and further preferably 70 mol % or more to less than 100 mol %. With the content of the conjugated diene compound (unit derived from the conjugated diene compound) falling within the ranges specified above, the copolymer of the present invention is allowed to uniformly behave as an elastomer.

According to the copolymer of the present invention, examples of the structure of the block copolymer include $(A-B)_x$, $A-(B-A)_x$, and $B-(A-B)_x$. Here, A represents a block sequence including monomer units of a non-conjugated olefin; B represents a block sequence including monomer units of a conjugated diene compound; and x represents an integer of at least 1, which is preferably an integer of 1 to 5. Here, boundaries between those block sequences do not have to be clearly identified, and there may be formed, for example, a so-called tapered structure, or a sequence including a mixture of a conjugated diene compound and a non-conjugated olefin, between the block sequence A and the block sequence B. Further, in a case where a copolymer includes a plurality of the same block sequences, each block sequence may be composed of monomers of different types and compositions.

A conjugated diene compound to be used as a monomer preferably has 4 to 12 carbon atoms. Specific examples of such conjugated diene compounds include: 1,3-butadiene; isoprene; 1,3-pentadiene; and 2,3-dimethyl butadiene, with the 1,3-butadiene and the isoprene being preferred. These conjugated diene compounds may be used alone or in combination of two or more.

Any of the aforementioned specific examples of conjugated diene compounds can be used for preparing the copolymer of the present invention in the same mechanism.

On the other hand, a non-conjugated olefin to be used as a monomer, which is a non-conjugated olefin other than the conjugated diene compound, may preferably be an acyclic olefin. Further, the non-conjugated olefin preferably has 2 to 10 carbon atoms. Therefore, preferred examples of the aforementioned non-conjugated olefin include α-olefins such as: ethylene; propylene; 1-butene; 1-pentene; 1-hexene; 1-heptene; and 1-octene. Of those, ethylene, propylene, 1-butene are more preferred, and ethylene is particularly preferred. These non-conjugated olefins may be used alone or in combination of two or more. Here, olefin refers to unsaturated aliphatic hydrocarbon, which is a compound containing at least one carbon-carbon double covalent bond.

Next, a method of manufacturing the copolymer according to the present invention will be described in detail. However, the manufacturing method described in detail below is merely an example.

A first method of manufacturing the copolymer of the present invention includes copolymerizing a conjugated diene compound and a non-conjugated olefin in the presence of a polymerization catalyst composition illustrated in below. Here, there may be employed an arbitrary polymerization method including, for example, solution polymerization, suspension polymerization, liquid phase bulk polymerization, emulsion polymerization, vapor phase polymerization, and solid state polymerization. Further, in the case of using a solvent for polymerization, any solvent that is inactive in polymerization can be used, and examples thereof include toluene, hexane, cyclohexane, and a mixture thereof.

<First Polymerization Catalyst Composition>

An example of the aforementioned polymerization catalyst composition preferably include a polymerization catalyst composition (hereinafter, also referred to as first polymerization catalyst composition) including at least one complex selected from a group consisting of: a metallocene complex represented by the following general formula (I); a metallocene complex represented by the following general formula (II); and a half metallocene cation complex represented by the following general formula (III):

[Formula 1]

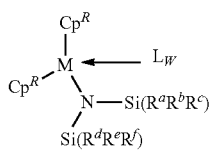
(I)

(In the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3);

[Formula 2]

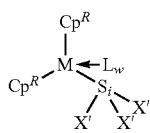
(II)

(In the formula (II), M represents a lanthanoid element, scandium, or yttrium; $Cp^R$ each independently represents an unsubstituted or substituted indenyl group; X' represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3.); and

[Formula 3]

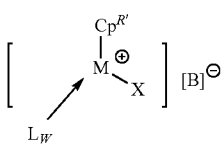
(III)

(In the formula (III), M represents a lanthanoid element, scandium, or yttrium; $Cp^{R'}$ each independently represents an unsubstituted or substituted cyclopentadienyl, indenyl, fluorenyl group; X represents a hydrogen atom, a halogen atom, an alkoxy group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion). The first polymerization catalyst composition may further include another component such as a co-catalyst, which is contained in a general polymerization catalyst composition containing a metallocene complex. Here, the metallocene complex is a complex compound having at least one more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one. In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group is a trimethylsilyl group. Specific examples of the substituted indenyl group include 2-phenyl indenyl, and 2-methyl indenyl. Two $Cp^R$ in the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a propyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

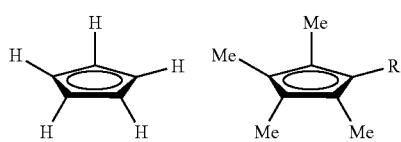
[Formula 4]

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements each with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R(R$^a$ to R$^f$ in the general formula (I)) in the silyl amide ligand each independently represent a hydrogen atom or an alkyl group having 1 to 3 carbon atoms, and it is preferred that at least one of R$^a$ to R$^f$ represents a hydrogen atom. With at least one of R$^a$ to R$^f$ representing a hydrogen atom, the catalyst can be synthesized with ease, and the height around silicon can be reduced, to thereby allow the non-conjugated olefin to be easily introduced. Based on the same objective, it is further preferred that at least one of R$^a$ to R$^c$ represents a hydrogen atom, and at least one of R$^d$ to R$^f$ represents a hydrogen atom. A methyl group is preferred as the alkyl group.

The metallocene complex represented by the general formula (II) includes a silyl ligand represented by [—SiX'$_3$]. X' in the silyl ligand represented by [—SiX'$_3$] is a group defined as the same as X in the general formula (III) described below, and preferred examples thereof are also the same as those of X in the general formula (III).

In the general formula (III), X represents a group selected from a group consisting of a hydrogen atom, a halogen atom, an alkoxy group, a thiolate group, an amide group, a silyl group, and a hydrocarbon group having 1 to 20 carbon atoms. In the general formula (III), the alkoxy group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group, with the bistrimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group, with the tris(trimethylsilyl)silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms represented by X include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (III), the bistrimethylsilyl amide group and the hydrocarbon group having 1 to 20 carbon atoms are preferred as X.

In the general formula (III), examples of the non-coordinating anion represented by [B]$^-$ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl) borate, tetrakis(tetrafluoromethylphenyl)borate, tetra(tolyl) borate, tetra(xylyl)borate, (tripheyl, pentafluorophenyl) borate, [tris(pentafluorophenyl), phenyl]borate, and tridecahydride-7,8-dicarbaundecaborate, with the tetrakis (pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated into the above mentioned complexes, respective L may be the same as or different from each other.

The metallocene complexes represented by the general formulae (I) to (II), and the half metallocene cation complex represented by the general formula (III) may be each present as a monomer or as a dimer or a multimer having two or more monomers.

The metallocene complex represented by the general formula (I) can be obtained by, for example, by subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the metallocene complex represented by the general formula (I) is described.

[Formula 5]

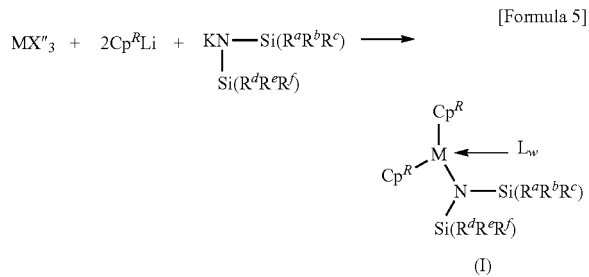

(In the formula, X" represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the metallocene complex represented by the general formula (II) is described.

[Formula 6]

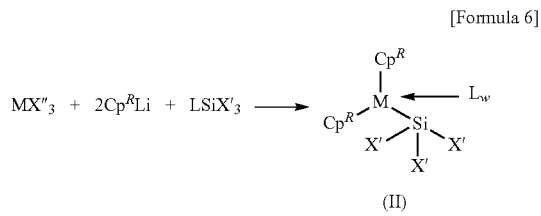

(In the formula, X" represents a halide.)

The half metallocene cation complex represented by the general formula (III) can be obtained by, for example, the following reaction.

[Formula 7]

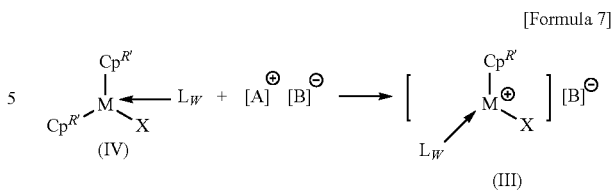

In the general formula (IV) representing a compound: M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl) carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred.

In the general formula $[A]^+[B]^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl) borate and triphenylcarbonium tetrakis(pentafluorophenyl) borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula [A]⁺[B]⁻ in combination.

Structures of the metallocene complex represented by the general formula (I) or (II) and of the half metallocene cation complex represented by the general formula (III) are preferably determined by X-ray crystallography.

The co-catalyst that can be contained in the first polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). A content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (where R and R' each independently represent a hydrocarbon group of $C_1$ to $C_{10}$ or a hydrogen atom, and R" is a hydrocarbon group of $C_1$ to $C_{10}$). Specific examples of the organic aluminum compound include a trialkyl aluminum, a dialkyl aluminum chloride, an alkyl aluminum dichloride, and a dialkyl aluminum hydride, with the trialkyl aluminum being preferred. Further, examples of the trialkyl aluminum include triethyl aluminum and triisobutyl aluminum. A content of the organic aluminum compound in the first polymerization catalyst composition is preferably 1-fold mol to 50-fold mol and more preferably about 10-fold mol, with respect to the metallocene complex.

In the first polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a copolymer to be obtained.

<Second Copolymerization Catalyst Composition>

A preferred example of the aforementioned polymerization catalyst composition may include:

a polymerization catalyst composition (hereinafter, also referred to as second polymerization catalyst composition) containing:

component (A): a rare earth element compound or a reactant of a rare earth element compound and a Lewis base, with no bond formed between the rare earth element and carbon;

component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the polymerization catalyst composition contains at least one kind of the ionic compound (B-1) and the halogen compound (B-3), the polymerization catalyst composition further contains:

component (C): an organic metal compound represented by the following general formula (i):

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a general rare earth element compound-based polymerization catalyst composition. In the polymerization system, the concentration of the component (A) contained in the second polymerization catalyst composition is preferably defined to fall within a range of 0.1 mol/L to 0.0001 mol/L.

The component (A) contained in the second polymerization catalyst composition is a rare earth element compound or a reactant of the rare earth element compound and a Lewis base. Here, a rare earth element compound or a reactant of the rare earth element compound and a Lewis base does not have a bond formed between the rare earth element and carbon. When the rare earth element compound or a reactant thereof does not have a bond formed between a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbium, thulium, ytterbuium, and lutetium. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

(where: $M^{11}$ represents a lanthanoid element, scandium, or yttrium; $X^{11}$ each independently represent a hydrogen atom, a halogen atom, an alkoxide group, a thiolate group, an amide group, a silyl group, an aldehyde residue, a ketone residue, a carboxylic acid residue, a thicarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid(butyl)(2-ethylhexyl), a phosphoric acid(1-methylheptyl)(2-ethylhexyl), and a phosphoric acid (2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, and a phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more.

As to the component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each Formula may be the same as or different from each other.

The component (B) contained in the second polymerization catalyst composition is at least one compound selected from a group consisting of: an ionic compound (B-1); an aluminoxane (B-2); and a halogen compound (B-3). The total content of the component (B) contained in the second polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis (pentafluorophenyl)borate and a triphenylcarbonium tetrakis (pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—) (where R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a cationic transition metal compound. The content of the halogen compound in the second polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; a diphenylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) contained in the second polymerization catalyst composition is an organic metal compound represented by the general formula (i):

$YR^1{}_aR^2{}_bR^3{}_c$         (i)

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (X):

$AlR^{11}R^{12}R^{13}$         (X)

(where $R^{11}$ and $R^{12}$ are the same or different hydrocarbon groups each having 1 to 10 carbon atoms or a hydrogen atom; and $R^{13}$ is a hydrocarbon group having 1 to 10 carbon atoms, in which $R^{13}$ may be the same as or different from $R^{11}$ or $R^{12}$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic metal compounds as the component (C) may be contained alone or in combination of two or more. The content of the organic aluminum compound in the second polymerization catalyst composition is preferably 1-fold mol to 50-fold mol, and more preferably about 10-fold mol, with respect to the component (A).

In the first method of manufacturing the copolymer according to the present invention, the polymerization can be carried out similarly to a general method of manufacturing a copolymer using a coordination ion polymerization catalyst, except in that the polymerization catalyst composition is used as described above. Here, according to the method of manufacturing the copolymer of the present invention, the method can be performed in either one of the following manners. That is, for example, (1) the components forming the polymerization catalyst composition may be separately provided in the polymerization reaction system including, as monomers, a conjugated diene compound and a non-conjugated olefin other than the conjugated diene compound, to thereby prepare the polymerization catalyst composition in the reaction system, or (2) the polymerization catalyst composition prepared in advance may be provided into the polymerization reaction system. Here, the method performed as described in the above item (2) also includes providing a metallocene complex (activated species) activated by a co-catalyst. The amount of the metallocene complex to be contained in the polymerization catalyst composition is preferably set to fall within a range of 0.0001-fold mol to 0.01-fold mol with respect to the total amount of the conjugated diene compound and the non-conjugated olefin other than the conjugated diene compound.

Further, in the first method of manufacturing the copolymer according to the present invention, a terminator such as ethanol and isopropanol may be used to stop the polymerization.

Further, according to the first method of manufacturing the copolymer according to the present invention, the polymerization reaction of the conjugated diene compound and the non-conjugated olefin may preferably be performed in an inert gas atmosphere, and preferably in an nitrogen or argon atmosphere. The polymerization temperature of the polymerization reaction is not particularly limited, and preferably in a range of, for example, $-100°$ C. to $200°$ C., and may also be set to temperatures around room temperature. An increase in polymerization temperature may reduce the cis-1,4-selectivity in the polymerization reaction. The polymerization reaction is preferably performed under pressure in a range of 0.1 MPa to 10 MPa so as to allow a conjugated diene compound and a non-conjugated olefin to be sufficiently introduced into the polymerization system. Further, the reaction time of the polymerization reaction is not particularly limited, and may be selected as appropriate depending on the conditions such as the type of the monomers to be polymerized, the type of the catalyst, and the polymerization temperature. The polymerization time is shorter than a polymerization time for synthesizing a conventional block copolymer formed of a conjugated diene compound and a non-conjugated olefin, for the purpose of avoiding the formation of long-chain non-conjugated olefin block components.

Further, according to the first method of manufacturing the copolymer of the present invention, in polymerizing a conjugated diene compound and a non-conjugated olefin, the concentration of the conjugated diene compound (mol/L) and the concentration of the non-conjugated olefin (mol/L) at the start of copolymerization preferably satisfy the following relation:

the concentration of the non-conjugated olefin/the concentration of the conjugated diene compound $\geq 1.0$; further preferably satisfy the following relation:

the concentration of the non-conjugated olefin/the concentration of the conjugated diene compound $\geq 1.3$; and still further preferably satisfy the following relation:

the concentration of the non-conjugated olefin/the concentration of the conjugated diene compound $\geq 1.7$.

The ratio of the concentration of the non-conjugated olefin to the concentration of the conjugated diene compound is defined to be at least 1, to thereby efficiently introduce the non-conjugated olefin into the reaction mixture.

The copolymer of the present invention can be manufactured even in a case of using a conventional coordination ion polymerization catalyst without using the first polymerization catalyst composition or the second polymerization catalyst composition, as long as the introduction of monomers to a polymerization system is controlled. Specifically, a second method of manufacturing the copolymer according to the present invention has a feature in that the introduction of a conjugated diene compound is controlled in the presence of a non-conjugated olefin so as to control the chain structure of the copolymer, to thereby control the arrangement of monomer units in the copolymer. According to the present invention, the term "polymerization system" herein refers to a location where a conjugated diene compound and a non-conjugated olefin are copolymerized, and a specific example thereof includes a reaction container or the like.

Here, the introduction of a conjugated diene compound may either be continuous introduction or divisional introduction. Further, the continuous introduction and the divisional introduction may be employed in combination. The continuous introduction herein refers to, for example, adding a conjugated diene compound at a certain addition rate for a certain period.

Specifically, introducing either divisionally or continuously a conjugated diene compound into a polymerization system for copolymerizing the conjugated diene compound and a non-conjugated olefin allows control of the concentration ratio of monomers in the polymerization system, with the result that the chain structure (that is, the arrangement of monomer units) in the copolymer to be obtained can be defined. Further, a conjugated diene compound is introduced in the presence of a non-conjugated olefin in the polymerization system, to thereby suppress generation of homopolymer of a conjugated diene compound. The polymerization of a non-conjugated olefin may be started prior to the introduction of a conjugated diene compound.

For example, in manufacturing a block copolymer by the second manufacturing method, it is effective to continuously introduce, to a polymerization system in which the polymerization of a non-conjugated olefin has already been started in advance, a conjugated diene compound in the presence of a non-conjugated olefin. In particular, in manufacturing a multiblock copolymer by the second manufacturing method, it is effective to repeat at least twice an operation of "polymerizing a non-conjugated olefin in a polymerization system, and then continuously introducing a conjugated diene compound into the polymerization system in the presence of a non-conjugated olefin".

The aforementioned second manufacturing method is not specifically limited as long as the introduction of monomers into a polymerization system is specified as described above, and there may be employed an arbitrary polymerization method including, for example, solution polymerization, suspension polymerization, liquid phase bulk polymerization, emulsion polymerization, vapor phase polymerization, and solid state polymerization. Further, the aforementioned second manufacturing method can be performed, similarly to the first manufacturing method, to polymerize a conjugated diene compound and a non-conjugated olefin as monomers, except in that the introduction of monomers into the polymerization system is specified as described above.

In the aforementioned second manufacturing method, the introduction of a conjugated diene compound needs to be controlled. Specifically, it is preferred to control the amount of a conjugated diene compound to be introduced and the number of times to introduce the conjugated diene compound. Examples of a method of controlling the introduction of a conjugated diene compound may include, but not limited to: a controlling method based on a computer program or the like; and an analog control method with the use of a timer or the like. Further, as described above, the method of introducing a conjugated diene compound is not specifically limited, and may be exemplified by continuous introduction or divisional introduction. Here, in divisionally introducing a conjugated diene compound, the number of times to introduce the conjugated diene is not specifically limited, and may preferably be in a range of 1 to 5. If a conjugated diene compound is introduced too many times, the resultant copolymer may become difficult to distinguish from a random copolymer.

Further, the aforementioned second manufacturing method requires the presence of a non-conjugated olefin upon introduction of a conjugated diene compound, and thus it is preferred to continuously feed a non-conjugated olefin to the polymerization system. Here, how to feed the non-conjugated olefin is not specifically limited.

(Rubber Composition)

The rubber composition of the present invention is not particularly limited as long as the block copolymer of the present invention is contained, and may be selected as appropriate depending on the application thereof. The rubber composition preferably contains rubber components other than the block copolymer of the present invention, such as a reinforcing filler and a crosslinking agent.

<Copolymer>

The content of the copolymer of the present invention in the rubber components is not particularly limited, and may be selected as appropriate depending on the application thereof. The preferred content of the copolymer is at least 3 mass %.

The content of the aforementioned copolymer in the rubber components falling short of 3 mass % may diminish the effect of the present invention or develop no effect at all.

<Rubber Components>

The rubber components are not particularly limited and may be selected as appropriate depending on the application thereof. Examples thereof include: the block copolymer of the present invention, natural rubber, various types of butadiene rubber, various types of styrene-butadiene copolymer rubber, isoprene rubber, butyl rubber, a bromide of a copolymer of isobutylene and p-methylstyrene, halogenated butyl rubber, acrylonitrile-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene rubber, acrylic rubber, epichlorohydrin rubber, polysulfide rubber, silicone rubber, fluororubber, and urethane rubber. These rubber components may be used alone or in combination of two or more.

<Reinforcing Filler>

The rubber composition may be mixed with a reinforcing filler as necessary. Examples of the reinforcing filler include a carbon black and an inorganic filler, and preferably at least one selected from the carbon black and the inorganic filler.

—Inorganic Filler—

The inorganic filler is not particularly limited and may be selected as appropriate depending on the application thereof. Examples thereof include silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. These rubber components may be used alone or in combination of two or more.

In using an inorganic filler, a silane coupling agent may also be used as appropriate.

The content of the reinforcing filler is not particularly limited and may be selected as appropriate depending on the application thereof. The preferred content thereof is 5 parts by mass to 200 parts by mass with respect to 100 parts by mass of the rubber component.

The reinforcing filler added by less than 5 parts by mass in content may show little effect of the addition thereof, whereas the content exceeding 200 parts by mass tends to hinder the reinforcing filler to be mixed into the rubber component, which may impairs the performance of the rubber composition.

<Crosslinking Agent>

The crosslinking agent is not particularly limited and may be selected as appropriate depending on the application thereof. Examples thereof include a sulfur-containing crosslinking agent, an organic peroxide-containing crosslinking agent, an inorganic crosslinking agent, a polyamine crosslinking agent, a resin crosslinking agent, a sulfur compound-based crosslinking agent, an oxime-nitrosamine-based crosslinking agent, and sulfur, with the sulfur-containing crosslinking agent being more preferred as the rubber composition for a tire.

The content of the crosslinking agent is not particularly limited and may be selected as appropriate depending on the application thereof. The preferred content thereof is 0.1 parts by mass to 20 parts by mass with respect to 100 parts by mass of the rubber component.

The crosslinking agent added by less than 0.1 parts by mass in content may hardly develop crosslinking, whereas the content exceeding 20 parts by mass tends to develop crosslinking by part of the crosslinking agent during the mixing, or to impair the physical property of the vulcanizate.

<Other Components>

Other than the above, a vulcanization accelerator may also be contained. Examples of compounds that can be used as the vulcanization accelerator include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a reinforcing agent, a softening agent, a filler, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agent may be used according to the purpose of use thereof.

(Crosslinked Rubber Composition)

The crosslinked rubber composition according to the present invention is not particularly limited as long as being obtained by crosslinking the rubber composition of the present invention, and may be selected as appropriate depending on the application thereof.

The conditions of the crosslinking are not particularly limited and may be selected as appropriate depending on the application thereof. The preferred conditions of temperature and heating time for the crosslinking may preferably be in a range of 120° C. to 200° C. for 1 minute to 900 minutes.

(Tire)

A tire of the present invention is not particularly limited as long as being manufactured by using the rubber composition of the present invention or the crosslinked rubber composition of the present invention, and may be selected as appropriate depending on the application thereof.

The rubber composition of the present invention or the crosslinked rubber composition of the present invention may be applied, for example, to a tread, a base tread, a sidewall, a side reinforcing rubber, and a bead filler of a tire, without being limited thereto.

The tire can be manufactured by a conventional method. For example, a carcass layer, a belt layer, a tread layer, which are composed of unvulcanized rubber, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire.

(Applications Other than Tires)

The rubber composition of the present invention or the crosslinked rubber composition of the present invention may be used for other applications than tires, such as anti-vibration rubber, seismic isolation rubber, a belt (conveyor belt), a rubber crawler, various types of hoses, and moran.

EXAMPLES

In the following, the invention of the present invention is described with reference to Examples. However, the present invention is no way limited to the following Examples.

Example 1

Into a 2 L stainless reactor that had been sufficiently dried, 150 mL toluene was added and then ethylene was introduced at 0.4 MPa. Meanwhile, in a glovebox under a nitrogen atmosphere, 14.5 μmol of bis(2-phenylindenyl)gadolinium bis (dimethylsilyl)amide [(2-PhC$_9$H$_6$)$_2$GdN(SiHMe$_2$)$_2$], 14.1 μmol of triphenylcarbonium tetrakis(pentafluorophenyl)borate (Ph$_3$CB(C$_6$F$_5$)$_4$), and 0.87 mmol of diisobutylaluminum hydride were provided in a glass container, which was dissolved into 5 mL of toluene, to thereby obtain a catalyst solution. After that, the catalyst solution was taken out from the glovebox and added by 14.1 μmol of gadolinium equivalent to the monomer solution, which was then subjected to polymerization at 50° C. for 10 minutes. Thereafter, 20 mL of a toluene solution containing 3.05 g (0.056 mol) of 1,3-butadiene was added while reducing the introduction pressure of ethylene at a rate of 0.2 MPa/min, and then polymerization was further performed for another 10 minutes. Next, repeated three times in total was an operation in which "the introduction pressure of ethylene was increased again to 0.8 MPa and polymerization was performed for 5 minutes, which is followed by the addition of 40 mL of a toluene solution containing 6.09 g (0.113 mol) of 1,3-butadiene while reducing the introduction pressure of ethylene at a rate of 0.2 MPa/min, and then polymerization was performed for another 20 minutes". After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer A. The yield of the copolymer A thus obtained was 20.10 g.

Example 2

In a 2 L stainless reactor that has been sufficiently dried, 1 L toluene was added and then ethylene was introduced thereto at 0.8 MPa. Meanwhile, in a glovebox under a nitrogen atmosphere, 18.2 μmol of bis(2-phethylindenyl)gadoliniumbis (dimethylsilyl)amide [(2-PhC$_9$H$_6$)$_2$GdN(SiHMe$_2$)$_2$], 18.2 μmol of triphenylcarbonium tetrakis(pentafluorophenyl)borate (Ph$_3$CB(C$_6$F$_5$)$_4$), and 2.73 mmol of diisobutylaluminum hydride were provided in a glass container, which was dissolved into 20 mL of toluene, to thereby obtain a catalyst solution. After that, the catalyst solution was taken out from the glovebox and added by 16.5 μmol of gadolinium equivalent to the monomer solution, and subjected to polymerization at 40° C. for 1 minutes. After the polymerization, 350 mL of a toluene solution containing 72 g (1.33 mol) of 1,3-butadiene was added while reducing the introduction pressure of ethylene at a rate of 0.2 MPa/min, and then the introduction pressure of ethylene was increased to 1.5 MPa to perform polymerization for 30 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer B. The yield of the copolymer B thus obtained was 43.50 g.

Example 3

In a 2 L stainless reactor that has been sufficiently dried, 1 L toluene was added and then ethylene was introduced thereto at 0.8 MPa. Meanwhile, in a glovebox under a nitrogen atmosphere, 18.2 μmol of bis(2-phethylindenyl)gadoliniumbis (dimethylsilyl)amide [(2-PhC$_9$H$_6$)$_2$GdN(SiHMe$_2$)$_2$], 18.2 μmol of triphenylcarbonium tetrakis(pentafluorophenyl)borate (Ph$_3$CB(C$_6$F$_5$)$_4$), and 2.73 mmol of diisobutylaluminum hydride were provided in a glass container, which was dissolved into 20 mL of toluene, to thereby obtain a catalyst solution. After that, the catalyst solution was taken out from the glovebox and added by 16.5 μmol of gadolinium equivalent to the monomer solution, and subjected to polymerization at 40° C. for 1 minutes. After the polymerization, 350 mL of a toluene solution containing 72 g (1.33 mol) of 1,3-butadiene was added while reducing the introduction pressure of ethylene at a rate of 0.2 MPa/min, and then the introduction pressure of ethylene was increased to 1.5 MPa to perform polymerization for 40 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer C (block copolymer). The yield of the copolymer C thus obtained was 50.50 g.

Comparative Example 1

Butadiene rubber (BR01, manufactured by JSR) was prepared as a sample of Comparative Example.

Comparative Example 2

A toluene solution of 700 mL containing 28.0 g (0.52 mol) of 1,3-butadiene was added to a 2 L stainless reactor that had been sufficiently dried, and then ethylene was introduced thereto at 0.8 MPa. Meanwhile, in a glovebox under a nitrogen atmosphere, 400.0 μmol of dimethylaluminum(μ-dimethyl)bis(2-phenylindenyl)neodymium [(2-PhC$_9$H$_6$)$_2$Nd(μ-Me)$_2$AlMe$_2$] and 200.0 μmol of triphenylcarbonium tetrakis(pentafluorophenyl)borate [Ph$_3$CB(C$_6$F$_5$)$_4$] were provided in a glass container, and dissolved into 80 mL of toluene, to thereby obtain a catalyst solution. After that, the catalyst solution was taken out from the glovebox, and the catalyst solution was added by 390.0 μmol of neodymium equivalent to the monomer solution, which was then subjected to polymerization at room temperature for 120 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer D (random copolymer). The yield of the copolymer D thus obtained was 18.00 g.

Comparative Example 3

As illustrated in Preparation 1 of JP 2000-86857 A, a toluene solution (manufactured by Tosoh Akzo Corporation) containing 26.0 g of toluene and 6.7 mmol of methylaluminoxane were provided in a sealed pressure tight glass ampoule having an inner capacity of 150 mL in a nitrogen atmosphere. A toluene solution containing 0.0067 mmol of 2-methoxycarbonyl methylcyclopentadienyl trichlorotitanium (MeO(CO)CH$_2$CpTiCl$_3$) (TiES) was delivered by drops into the ampoule which was held at aging temperature (25° C.) over an aging time of 5 minutes. Thereafter, the temperature was reduced to −25° C., and a solution containing 2.0 g of butadiene and 6.0 g of toluene was added, which was then subjected to polymerization at this temperature for 30 minutes. Subsequently, ethylene was supplied into the container to give a pressure of 5 kgf/cm$^2$, and the reaction was carried out for about 1 hour. Thereafter, a small amount of an acidic methanol solution was added to stop the polymerization reaction, and then the polymerization solution was poured into a large amount of acidic methanol, so that a precipitated white solid was collected by filtration and dried to obtain a copolymer E (block copolymer).

Comparative Example 4

Ethylene was introduced at 0.8 MPa into a 400 mL pressure-resistant grass reactor that had been sufficiently dried, and then 160 mL of a toluene solution containing 9.14 g (0.17 mol) of 1,3-butadiene was added thereto. Meanwhile, in a glovebox under a nitrogen atmosphere, 28.5 μmol of bis(2-phenylindenyl)gadolinium bis(dimethylsilyl)amide [(2-PhC$_9$H$_6$)$_2$GdN(SiHMe$_2$)$_2$], 34.2 μmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 μmol of gadolinium equivalent to the monomer solution, which was then subjected to polymerization at room temperature for 60 minutes. Thereafter, 60 mL of a toluene solution containing 9.14 g (0.17 mol) of 1,3-butadiene was newly added at a rate of 1.0 ml/min while reducing the introduction pressure of ethylene at a rate of 0.1 MPa/min, and then polymerization was further performed for another 60 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer F (tapered copolymer). The yield of the copolymer F thus obtained was 16.30 g.

Comparative Example 5

Into a 2 L stainless reactor that had been sufficiently dried, 150 mL toluene was added and then ethylene was introduced at 0.8 MPa. Meanwhile, in a glovebox under a nitrogen atmosphere, 14.5 μmol of bis(2-phenylindenyl)gadolinium bis(dimethylsilyl)amide [(2-PhC$_9$H$_6$)$_2$GdN(SiHMe$_2$)$_2$], 14.1 μmol of triphenylcarbonium tetrakis(pentafluorophenyl)borate (Ph$_3$CBC$_6$F$_5$)$_4$), and 0.87 mmol of diisobutylaluminum hydride were provided in a glass container, which was dissolved into 5 mL of toluene, to thereby obtain a catalyst solution. After that, the catalyst solution was taken out from the glovebox and added by 14.1 μmol of gadolinium equivalent to the monomer solution, which was then subjected to polymerization at 80° C. for 15 minutes. Thereafter, 20 mL of a toluene solution containing 3.05 g (0.056 mol) of 1,3-butadiene was added while reducing the introduction pressure of ethylene at a rate of 0.2 MPa/min, and then polymerization was further performed for another 15 minutes. Next, repeated three times in total was an operation in which "the introduction pressure of ethylene was increased again to 0.8 MPa and polymerization was performed for 5 minutes, which is followed by the addition of 40 mL of a toluene solution containing 6.09 g (0.113 mol) of 1,3-butadiene while reducing the introduction pressure of ethylene at a rate of 0.2 MPa/min, and then polymerization was performed for another 30 minutes". After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer G. The yield of the copolymer G thus obtained was 21.00 g.

Figure 2:
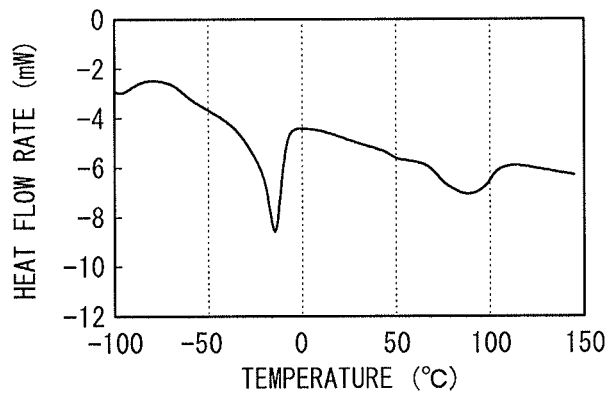
FIG. 2 shows a DSC curve of a block copolymer B.
Figure 3:
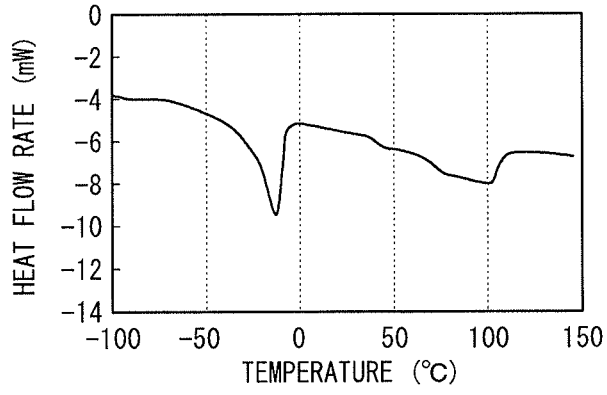
FIG. 3 shows a DSC curve of a block copolymer C.
Figure 4:
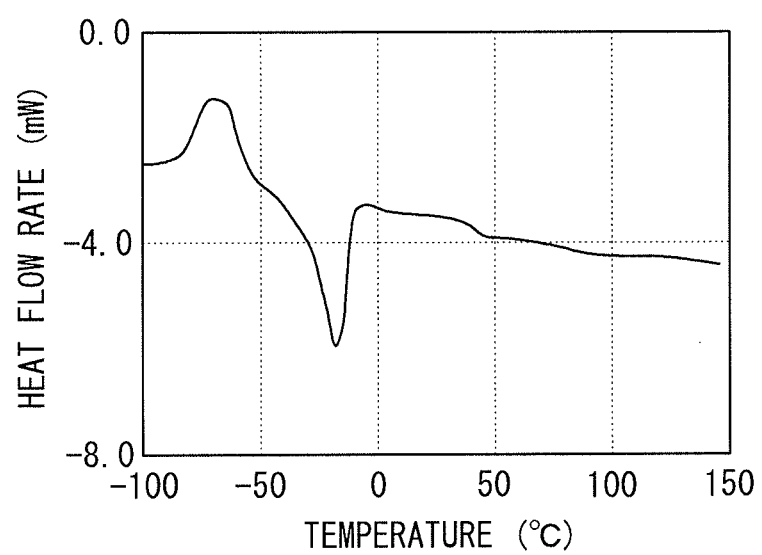
FIG. 4 shows a DSC curve of a random copolymer D.
Figure 5:
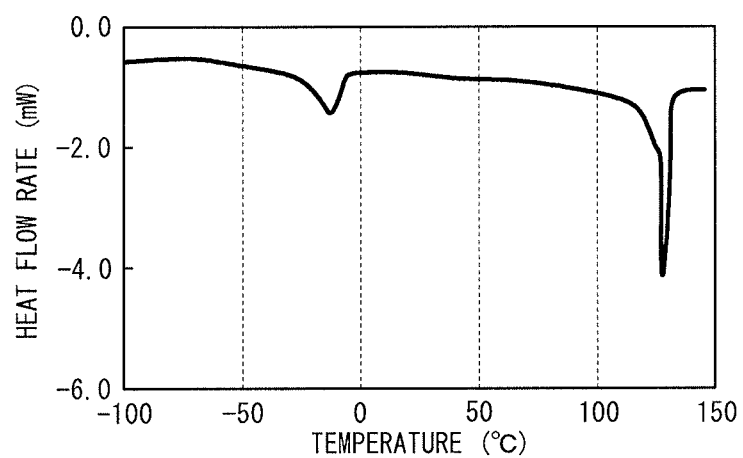
FIG. 5 shows a DSC curve of a block copolymer E.
Figure 6:
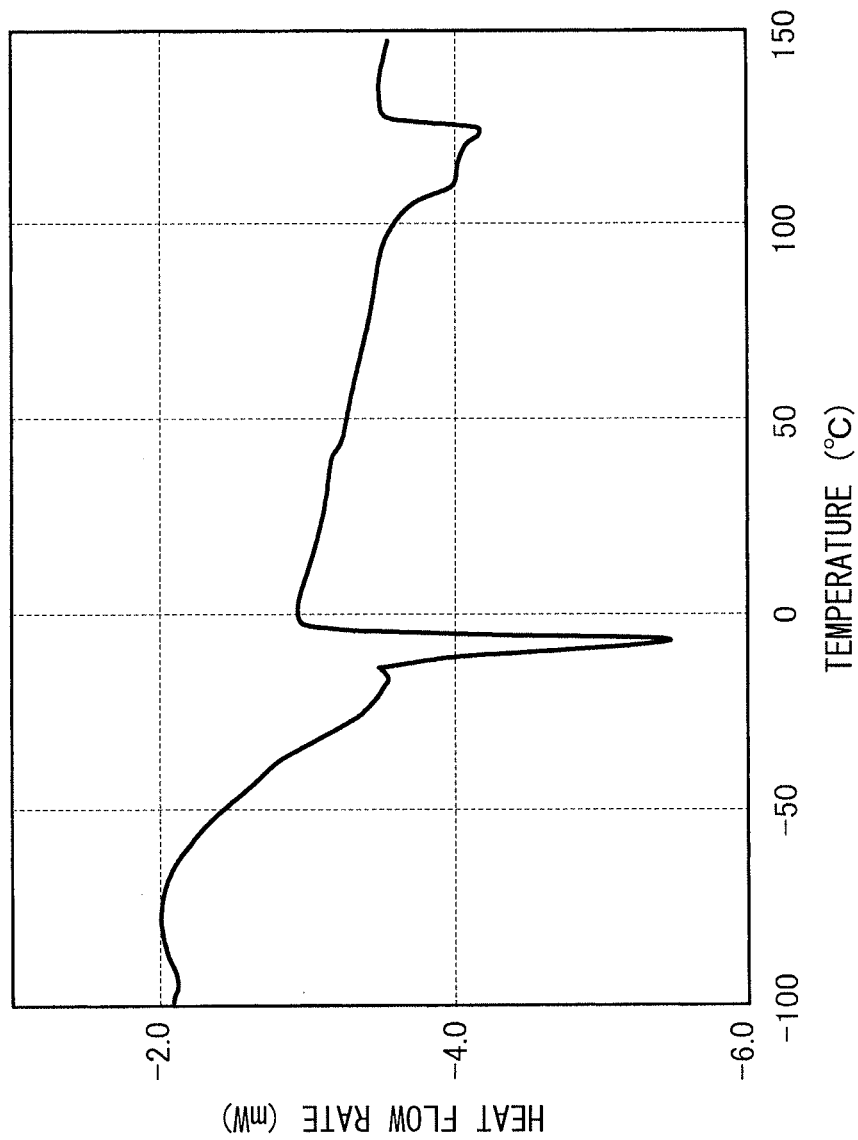
FIG. 6 shows a DSC curve of a tapered copolymer F.

The copolymers A to C of Examples 1 to 3, the butadiene rubber of Comparative Example 1, and the copolymers D to G of Comparative Examples 2 to 5 manufactured or obtained as described above were each subjected to measurement and evaluation by the following method so as to investigate the microstructure (cis-1,4 bond content), the ethylene content, the weight-average molecular weight (Mw), the molecular weight distribution (Mw/Mn), and the DSC curve (the peak area ratio (%) at 70° C. to 110° C. and the peak area ratio (%) at 110° C. to 140° C.). FIG. 1 shows a DSC curve of the copolymer A, FIG. 2 shows a DSC curve of the copolymer B, FIG. 3 shows a DSC curve of the copolymer C, FIG. 4 shows a DSC curve of the copolymer D, FIG. 5 shows a DSC curve of the copolymer E, and FIG. 6 shows a DSC curve of the copolymer F. Here, the ordinate of the DSC curve is the heat flow rate.

(1) Microstructure (Cis-1,4 Bond Content)

The (cis-1,4 bond content) of the butadiene unit in the copolymer is determined from an integral ratio of cis-1,4 bond component (26.5 ppm to 27.5 ppm) to a butadiene bond component (26.5 ppm to 27.5 ppm+31.5 ppm to 32.5 ppm) of the whole, based on $^{13}$C-NMR spectrum (100° C., d-tetrachloroethane standard: 7.38 ppm). The calculated values of the cis-1,4 bond content (%) is shown in Table 1.

(2) Ethylene Content

The content of the ethylene unit in the copolymer is determined from an integral ratio of an ethylene bond component (28.5 ppm to 30.0 ppm) of the whole to a butadiene bond component (26.5 ppm to 27.5 ppm +31.5 ppm to 32.5 ppm) of the whole, based on $^{13}$C-NMR spectrum (100° C., d-tetrachloroethane standard: 73.8 ppm). The content (mol %) of the ethylene unit is shown in Table 1.

(3) Weight-Average Molecular Weight (Mw) and Molecular Weight Distribution (Mw/Mn)

A polystyrene equivalent weight-average molecular weight (MW) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 140° C.

(4) DSC Curve

A DSC curve of each copolymer was obtained by differential scanning calorimetry (DSC) according to JIS K 7121-1987, and (i) a ratio (%) of a peak area at 70° C. to 110° C. to a peak area at 40° C. to 140° C. and (ii) a ratio (%) of a peak area at 110° C. to 140° C. to a peak area at 40° C. to 140° C. were measured. In the measurement, used as samples were rubber components obtained by immersing each copolymer in a large amount of tetrahydrofuran for 48 hours so as to remove all the components dissolved in the tetrahydrofuran and then by drying the copolymer, in order to circumvent the effect to be produced by impurities such as single polymers and catalyst residues.

The DSC curves of the copolymers A to C of FIGS. 1 to 3 each shows, in the vicinity of −10° C., a crystallization temperature derived from the block sequence including monomer cis units of 1,3-butadiene and, in the vicinity of 70° C. to 100° C., a crystallization temperature derived from a short block sequence including monomer units of ethylene, the crystallization temperatures being observed through DSC.

Further, the $^{13}$C-NMR spectrum chart of each of the copolymers A to C shows peaks derived from ethylene block sequence at 29.4 ppm.

The aforementioned measurement revealed that the copolymers A to C each were block copolymers of 1,3-butadiene and ethylene.

In the DSC curve of the copolymer D of FIG. 4, a peak to be derived from the block sequence including monomer units of ethylene could not be observed in a temperature range of 40° C. to 140° C. Further, the $^{13}$C-NMR spectrum chart of the copolymer F shows, as peaks derived from ethylene in a range of 27.5 ppm to 33 ppm, many peaks observed other than a peak at 29.4 ppm indicating at least four-chained ethylene (indicating a block sequence), which means that ethylene units having three or less chains are also arranged in butadiene, and thus it was identified that the copolymer D was a random copolymer.

In the DSC curve of the copolymer E of FIG. 5, crystallization temperatures in a temperature range of 40° C. to 110° C. to be derived from a random sequence or a short block sequence including a monomer units of ethylene were hardly observed in a temperature range of 40° C. to 140° C. Further, the $^{13}$C-NMR spectrum chart only showed, as peaks derived from ethylene in a range of 27.5 ppm to 33 ppm, a peak at 29.4 ppm derived from an ethylene block sequence, and thus it was identified that the copolymer E was a block copolymer having a long-chain block sequence.

The DSC curve of the copolymer F of FIG. 6 shows, with respect to a total endothermic peak area derived from the ethylene chain in a temperature range of 40° C. to 140° C., a broad endothermic peak observed in a temperature range of 40° C. to 110° C., indicating formation of a random sequence which includes randomly-arranged monomer units of butadiene and ethylene (including a block of low molecular weight) and of a short block sequence which includes monomer units of ethylene, other than an endothermic peak in a temperature

TABLE 1

| | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Copolymer | A | B | C | butadiene rubber | D | E | F | G |
| Mw (×10$^3$) | 225 | 358 | 325 | 454 | 263 | 230 | 295 | 256 |
| Mw/Mn | 2.39 | 2.50 | 2.66 | 3.45 | 1.58 | 1.32 | 2.50 | 2.51 |
| Cis-1,4 Bond Content (%) | 98 | 98 | 98 | 97 | 91 | 92 | 98 | 98 |
| Ethylene Content (mol %) | 16 | 26 | 35 | — | 15 | 9 | 15 | 23 |
| 70-110° C. area (%) | 68 | 72 | 75 | — | 54 | 3 | 30 | 55 |
| 110-140° C. area (%) | 14 | 1 | 3 | — | 0 | 97 | 63 | 25 |
| High Temperature Elongation at Break (Index) | 112 | 108 | 104 | 100 | 108 | 104 | 112 | 105 |
| Low-Heat Generation (Index) | 116 | 120 | 114 | 100 | 120 | 114 | 116 | 110 |
| Fatigue Resistance (Bending + Elongation Test) | >200 | >200 | >200 | 100 | 105 | 110 | 135 | 142 | range of 110° C. or above derived from the crystallization temperature of the long-chain block sequence including monomer units of ethylene.

Further, the $^{13}$C-NMR spectrum chart of the copolymer F also shows, as peaks derived from ethylene in a range of 27.5 ppm to 33 ppm, a peak observed other than a peak at 29.4 ppm indicating at least four-chained ethylene (indicating a block sequence), and thus it was identified that the copolymer F is a tapered copolymer in which a random sequence including ethylene units having three or less chains and a long-chain block sequence are both distributed.

As to Examples 1 to 3 and Comparative Examples 1 to 5, the rubber compositions formulated as shown in Table 2 were prepared, which were vulcanized at 160° C. for 20 minutes. The vulcanized rubber compositions thus obtained were subjected to measurements of low-heat generation (index) and fatigue resistance (bending+elongation test), and high temperature elongation at break according to the following method.

TABLE 2

|  | parts by mass |
| --- | --- |
| copolymer | 100 |
| stearic acid | 2 |
| carbon black (FEF class) | 50 |
| age resistor *1 | 1 |
| zinc oxide | 3 |
| co-agent CZ-G *2 | 0.4 |
| co-agent DM-P *3 | 0.2 |
| sulfur | 1.4 |

*1 N-(1,3-dimethylbutyl)-N'-p-phenylenediamine (NOCRAC 6C), manufactured by OUCHI SHINKO CHEMICAL INDUSTRIAL CO., LTD.
*2 N-cyclohexyl-2-benzothiazolesulfenamide (NOCCELER CZ-G), manufactured by OUCHI SHINKO CHEMICAL INDUSTRIAL CO., LTD.
*3 dibenzothiazyl disulfide (NOCCELER DM-P), manufactured by OUCHI SHINKO CHEMICAL INDUSTRIAL CO., LTD.

<<Low-Heat Generation (Index)>>

Using a dynamic spectrometer (manufactured by Leometrix Co., Ltd. of the US), a loss tangent (10% tan δ) was measured for a tensile dynamic strain of 10% and a frequency of 15 Hz at a temperature of 50° C. The results are shown in Table 1. In Table 1, values for "Low-Heat Generation (Index) are obtained as Low-Heat Generation (Index)=Loss Tangent/ (Loss Tangent of Comparative Example 1)×100. A larger index value shows more excellent low-heat generation property (low loss property).

<<Fatigue Resistance (Bending+Elongation Test)>>

A crack of 0.5 mm was produced in the center of JIS No. 3 test piece, and the test piece was repeatedly subjected to bending fatigue and elongation fatigue under a constant strain of −50% to 100% at room temperature, so as to count the number of times the sample was subjected to fatigue until fracture occurred. The measurement results obtained for Examples 1 to 3 and Comparative Examples 2 to 5 were indexed with a score of 100 representing the result obtained for Comparative Example 1. A larger index value shows more excellent fatigue resistance. Table 1 shows the results thereof. In Table 1, ">200" means that no fracture occurred in the sample despite repetitive fatigue applied twice as many as those applied to Comparative Example 1.

<<Tension Test>>

Each sample was subjected to tension test according to JIS K 6251 at a temperature condition of 100° C., to thereby obtain the elongation at break. Table 1 shows the results obtained for Comparative Examples and Examples with a score of 100 representing the elongation at break obtained for Comparative Example 1. A larger index value shows more excellent high temperature elongation at break. Table 1 shows the results thereof.

The results shown in Table 1 shows that Examples 1 to 3 each using a block copolymer with a peak area in a range of 70° C. to 110° C. that accounts for at least 60% of a peak area in a range of 40° C. to 140° C. and with a peak area in a range of 110° C. to 140° C. that accounts for 20% or less of a peak area in a range of 40° C. to 140° C., the peak areas being measured by the differential scanning calorimetry (DSC) according to JIS K 7121-1987, are excellent in fatigue resistance, low-heat generation property, and elongation at break, as compared to Comparative Examples 1 to 5 that do not use the aforementioned block copolymer.

Industrial Applicability

The copolymer of the present invention can be used generally for elastomer products, in particular, tire members.

The invention claimed is:

1. A copolymer of a conjugated diene compound and a non-conjugated olefin, wherein the copolymer is a block copolymer having a peak area in a range of 70° C. to 110° C. that accounts for at least 60% of a peak area in a range of 40° C. to 140° C. and a peak area in a range of 110° C. to 140° C. that accounts for 20% or less of a peak area in a range of 40° C. to 140° C., the peak areas being measured by the differential scanning calorimetry (DSC) according to JIS K 7121-1987.

2. The copolymer according to claim 1, wherein the conjugated diene compound unit has a cis-1,4 bond content of at least 80%.

3. The copolymer according to claim 1, wherein the non-conjugated olefin is contained over 0 mol % to 40 mol % or less.

4. The copolymer according to claim 1, wherein the block copolymer has any one of the structures of (A-B)x, A-(B-A)x and B-(A-B)x,
where A represents a block sequence including monomer units of the non-conjugated olefin, B represents a block sequence including monomer units of the conjugated diene compound, and x represents an integer of at least 1.

5. The copolymer according to claim 1, comprising a copolymer having a polystyrene-equivalent average-weight molecular weight of 10,000 to 10,000,000.

6. The copolymer according to claim 1, comprising a copolymer having a molecular weight distribution (Mw/Mn) of 10 or less.

7. The copolymer according to claim 1, wherein the non-conjugated olefin is an acyclic olefin.

8. The copolymer according to claim 1, wherein the non-conjugated olefin has 2 to 10 carbon atoms.

9. The copolymer of according to claim 7, wherein the non-conjugated olefin is at least one selected from a group consisting of ethylene, propylene, and 1-butene.

10. The copolymer according to claim 9, wherein the non-conjugated olefin is ethylene.

11. The copolymer according to claim 1, wherein the conjugated diene compound is at least one selected from a group consisting of 1,3-butadiene and isoprene.

12. A rubber composition comprising the copolymer according to claim 1.

13. The rubber composition according to claim 12, comprising, with respect to 100 parts by mass of the rubber component, a reinforcing filler by 5 parts by mass to 200 parts by mass and a crosslinking agent by 0.1 parts by mass to 20 parts by mass.

14. A crosslinked rubber composition obtained by crosslinking the rubber composition according to claim 12.

15. A tire manufactured by using the rubber composition according to claim 12.

* * * * *